United States Patent [19]
Cotter et al.

[11] Patent Number: 5,127,510
[45] Date of Patent: Jul. 7, 1992

[54] MODULAR DIVERTER SHOE AND SLAT CONSTRUCTION

[75] Inventors: David H. Cotter, Coopersville; Bernard H. Woltjer, Jenison; Curtis E. LeMay, Shelbyville, all of Mich.

[73] Assignee: Rapistan Demag Corporation, Grand Rapids, Mich.

[21] Appl. No.: 758,340

[22] Filed: Aug. 28, 1991

Related U.S. Application Data

[63] Continuation of Ser. No. 606,585, Oct. 31, 1990, abandoned.

[51] Int. Cl.⁵ ............................................. B65G 47/46
[52] U.S. Cl. .................................... 198/372; 198/456; 198/440
[58] Field of Search .............. 198/365, 370, 372, 456, 198/440, 457

[56] References Cited

U.S. PATENT DOCUMENTS

| | | |
|---|---|---|
| 396,532 | 1/1889 | Bramwell . |
| 440,931 | 11/1890 | Swenson . |
| 449,464 | 3/1891 | Cook . |
| 1,859,038 | 5/1932 | Irgens . |
| 2,214,177 | 9/1940 | Raybould . |
| 2,904,379 | 9/1959 | Nelson . |
| 3,009,572 | 11/1961 | Seaborn . |
| 3,333,873 | 8/1967 | Triplett . |
| 3,361,247 | 1/1968 | Lauzon et al. . |
| 3,731,782 | 5/1973 | Del Rosso . |
| 3,774,748 | 11/1973 | Dederer et al. . |
| 3,986,596 | 10/1976 | Hamilton . |
| 4,089,408 | 5/1978 | Vanderhoof . |
| 4,138,008 | 2/1979 | Del Rosso . |
| 4,223,777 | 9/1980 | Aykut . |
| 4,271,960 | 6/1981 | Chalich . |
| 4,319,676 | 3/1982 | Turnbough . |
| 4,326,626 | 8/1982 | Brockwell . |
| 4,508,206 | 4/1985 | Moore et al. . |
| 4,526,271 | 7/1985 | Finnighan . |
| 4,637,508 | 1/1987 | Kikuchi et al. . |
| 4,711,341 | 12/1987 | Yu et al. . |
| 4,738,347 | 4/1988 | Brouwer et al. . |
| 4,756,639 | 7/1988 | Hoshino . |
| 4,760,908 | 8/1988 | Houghton . |
| 4,770,291 | 9/1988 | Shaw . |
| 4,884,677 | 12/1989 | Yu et al. . |
| 4,896,760 | 1/1990 | Triantafilou et al. . |

Primary Examiner—D. Glenn Dayoan
Attorney, Agent, or Firm—Price, Heneveld, Cooper, DeWitt & Litton

[57] ABSTRACT

A sortation system includes a plurality of slats connected at opposite ends in spaced relation with each other to a pair of endless chains. The slats define a conveying surface moving longitudinally along a frame. A plurality of diverter shoes are provided. Each diverter shoe is movably mounted on one of the slats for lateral movement with respect to the conveying surface. Each slat is defined by a wall formed as a right cylinder including an outer surface having a planar upper portion defining the conveying surface, each diverter shoe having a support portion including a substantially continuous glide surface surrounding the wall, the glide surface having substantially the same configuration as the outer surface of the slat.

Each diverter shoe additionally has a diverting portion joined to the support portion by a dove-tail groove and includes one or more vertical diverting surfaces and a plurality of contiguous, generally planar surfaces sloping downwardly from the upper extent of each diverting surface laterally inwardly as well as forwardly and rearwardly. Different configurations of diverting portions may be easily applied to the support portions to accommodate left-hand divert, right-hand divert or bi-directional divert applications. Both the support and diverting portions are defined by a plurality of wall segments having substantially the same thickness and arranged in a honey-comb manner.

51 Claims, 6 Drawing Sheets

MODULAR DIVERTER SHOE AND SLAT CONSTRUCTION

This is a continuation of application Ser. No. 07/606,585 filed on Oct. 31, 1990 now abandoned.

BACKGROUND OF THE INVENTION

This invention relates to a conveyor sortation system and in particular to a positive displacement sortation system in which diverting shoes travelling with the conveyor surface laterally diverts packages onto selected spur lines.

Positive displacement sortation systems, such as the type disclosed in U.S. Pat. No. 4,738,347 for DIVERTER SHOE AND DIVERTING RAIL, issued to Gerald A. Brouwer and assigned to the present assignee, have long been known. Such a system includes a pair of endless chains and a plurality of slats connected at opposite ends to the chains in order to provide a moving conveyor surface. A diverting shoe is mounted to each slat in a manner that the shoe may glide across the slat. Movement of the shoes is effected by a guide pin and coaxial bearing, depending from the shoe, which engage a network of guide tracks beneath the conveying surface. At the loading end of the sortation system, the shoes all have a particular orientation to one side of the packages. When a package is to be diverted to a spur, a diverter switch is actuated to switch the guide pins for the shoes adjacent the package onto a diagonal track which causes the affected shoes to glide across the slats to divert the package.

The diverting motion applies reaction forces to the shoes tending to rotate the shoes about their vertical axis as well as about the long axis of the slats. These forces, of course, increase with heavier packages and those having a high coefficient of friction with the slats. These difficulties are aggravated by a desire to provide ever-increasing line speeds, which require greater ease of gliding between the shoe and the slats. Efforts to provide structural support to resist the reactive forces tend to be at odds with ease of glide.

SUMMARY OF THE INVENTION

The present invention provides a sortation system which is capable of very high line speeds without excessive line noise by utilizing unique slats and diverter shoes, which are capable of rapid and smooth gliding along the slats while resisting reactionary forces. The invention further provides modular diverter shoes having interchangeable upper diverting portions for use with right-hand, left-hand and bi-lateral divert systems and which have a profile that reduces the potential for package jamming.

The invention is embodied in a sortation system in which each of the slats is defined by a wall having a planar upper portion that defines the conveyor surface in combination with diverter shoes having a support portion including a substantially continuous glide surface that surrounds the slat and has substantially the same configuration as the outer surface of the slat. In a preferred embodiment, the slat has a parallelogram cross-section and bearing means are defined between at least one edge of each slat and an engaging portion of the glide surface of the diverter shoe. The bearing means is provided by an enlarged radius surface at the slat edge. Such bearing means are preferable provided at diagonally opposite slat edges in order to better resist reaction forces about the axis of the slat.

A lateral stabilizing means is additionally provided between each slat and an engaging portion of the glide surface of the corresponding diverter shoe in order to resist vertical axis reaction forces. The lateral stabilizing means is preferably a T-shaped outward extension of one portion of the slat engaging a mating portion of the shoe glide surface.

According to another aspect of the invention, a diverter shoe includes a support member having a glide portion including mean defining a glide surface adapted to glide along one of the slats. A diverting member is joined to the support member and includes one or more substantially vertical diverting surfaces on a lateral end of the member. A plurality of contiguous, generally planar surfaces slope downwardly from the upper extent of this diverting surface laterally inward and longitudinally forward and rearward on the diverting member. This configuration provides a profile with a greatly reduced tendency to jam packages. The diverting surface is on opposite sides of the diverting member for right-hand and left-hand diverting systems and two such vertical diverting surfaces are provided for a bi-directional divert system.

Each of the support member and the diverting member is defined by a multiplicity of interconnected wall segments having substantially the same thickness. By a unique arrangement of such wall segments, the members may be provided with exceptional strength by being molded of a polymeric material. This imparts both a light-weight design and an anti-friction engagement with the slat for ease of glide.

These and other objects, advantages and features of this invention will become apparent upon review of the following specification in conjunction with the drawings.

DESCRIPTION OF THE PREFERRED EMBODIMENT

Figure 1:
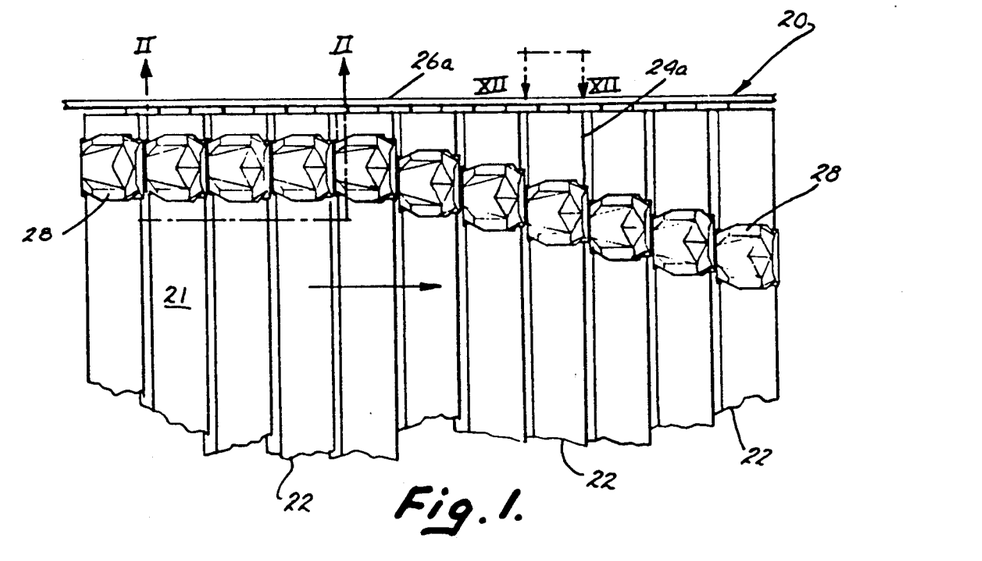
FIG. 1 is a plan view of a sortation system according to the invention.
Figure 2:
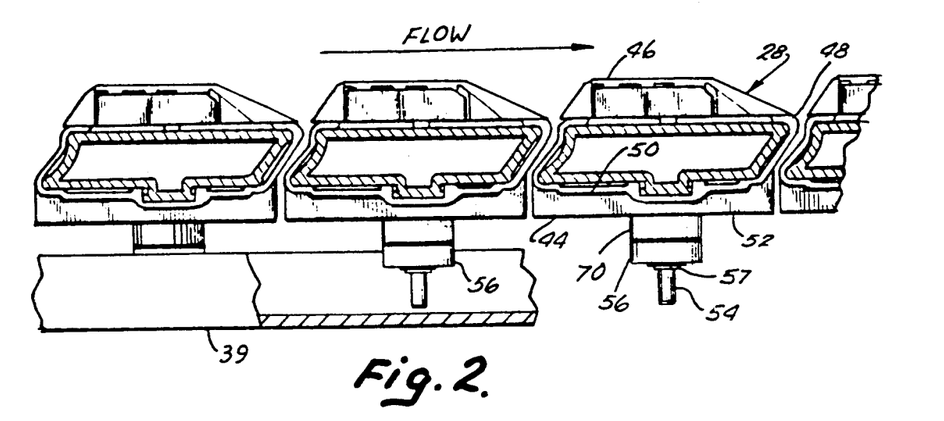
FIG. 2 is a sectional view taken along the lines II—II in FIG. 1.

Referring now specifically to the drawings, and the illustrated embodiments depicted therein, a sortation system 20 includes a plurality of slats 22, each having a first end 24a attached to an endless chain 26a and a second end attached to a second endless chain (not shown). A diverter shoe 28 is mounted to each slat 22 for gliding movement laterally along the length of the slat (FIGS. 1 and 2). Movement of the shoe is guided by a network of guide tracks 39 engaging a bearing 56 and changes in direction of movement are initiated by a diverter switch (not shown) engaging a diverter pin 54.

Figure 3:
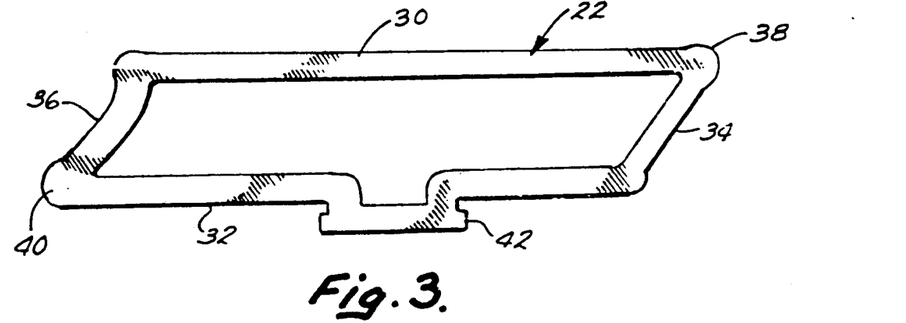
FIG. 3 is an enlarged elevation of a slat useful in practicing the invention.

Slat 22 includes an upper wall 30, a lower wall 32, an upwardly forwardly sloping front wall 34 and rear wall 36 (FIG. 3). As such, slat 22 is quadrilateral in cross-section in a manner which defines a parallelogram having parallel upper and lower walls and parallel forward and rear walls. Slat 22 is a right-cylinder and, in the preferred embodiment, is an extrusion, preferably an aluminum extrusion. Forward wall 34 joins upper wall 30 at an enlarged radius corner 38. Rear wall 36 joins lower wall 32 at an enlarged radius corner 40. A T-shaped extension 42 projects downwardly from bottom wall 32.

Figure 8:
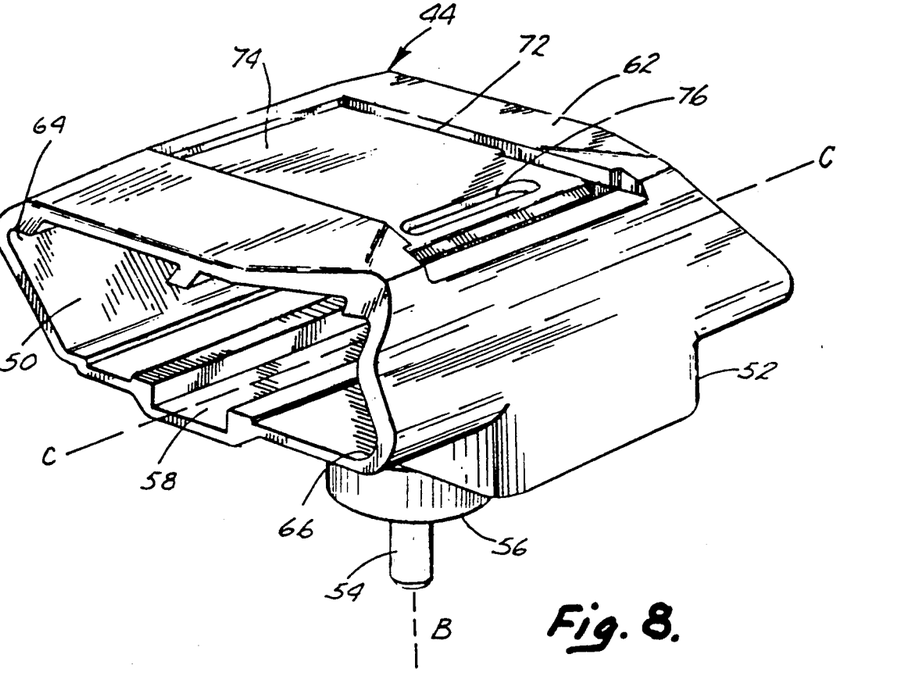
FIG. 8 is a perspective view taken from the top left front of a support member.
Figure 9:
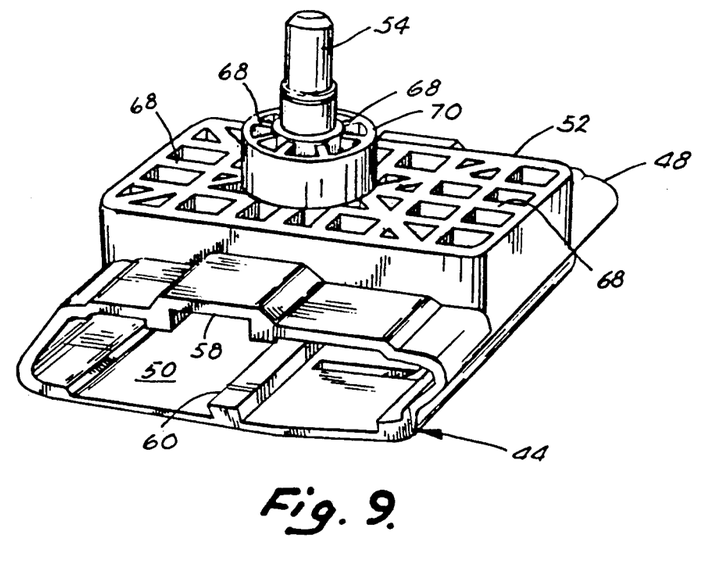
FIG. 9 is a perspective view taken from the bottom left rear of the support member illustrated in FIG. 8 with the roller bearing removed to reveal additional portions of the support member.
Figure 11:
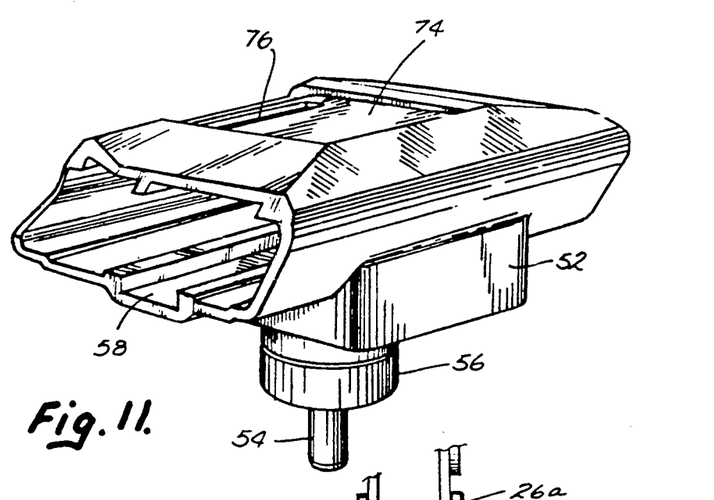
FIG. 11 is a perspective view taken from the top left front of the support member in FIGS. 8 and 9.

Each diverting shoe 28 includes a support member 44 and a diverting member 46 mounted to the support member (FIG. 2). Support member 44 includes a glide portion 48 having a continuous glide surface 50 having substantially the same configuration as the outer surface of slat 22 for gliding movement along the slat. Guide portion 48 additionally includes a base 52 having a cylindrical projection 70 which mounts a diverter pin 54 and coaxial bearing 56 by frictional engagement of the diverter pin in an opening defined in projection 70. The bearing is rotated on an enlarged base of the diverter pin and held in place by a c-clip 57. Continuous surface 50 includes a channel 58 surrounding projection 42 of the slat such that the projection rides within the channel (FIGS. 8, 9 and 11). Continuous surface 50 additionally includes a support rib 60 which engages top wall 30 of the slat to support an upper wall 62 of the support member. Continuous surface 50 additionally includes an enlarged radius forward upper corner 64 and an enlarged radius lower rear corner 66, in which enlarged radius corners 38 and 40 of the slat, respectively, ride. This arrangement provides bearing engagement between the enlarged radius corners of the slat and the corresponding corners of surface 50 to resist reaction forces tending to rotate the shoes about the axis of elongation of the slat.

Base 52 is a honey-comb structure made up of a multiplicity of wall segments 68 which all have a common wall thickness and substantially the same wall thickness as the other walls of guide portion 48 to ensure uniform cure of all walls. A cylindrical projection 70, which has a honey-comb structure similar to that of base 52, extends from the base in order to support the bearing 56 and diverter pin 54. This structure also provides a break-away feature. If a diverter shoe jams for any reason, projection 70 will shear from the remainder of the base to avoid damage to expensive portions of the sortation system. Upper wall 62 includes an angled undercut 72 to define a recessed portion 74. Portion 74 includes a locking slot 76.

Figure 4:
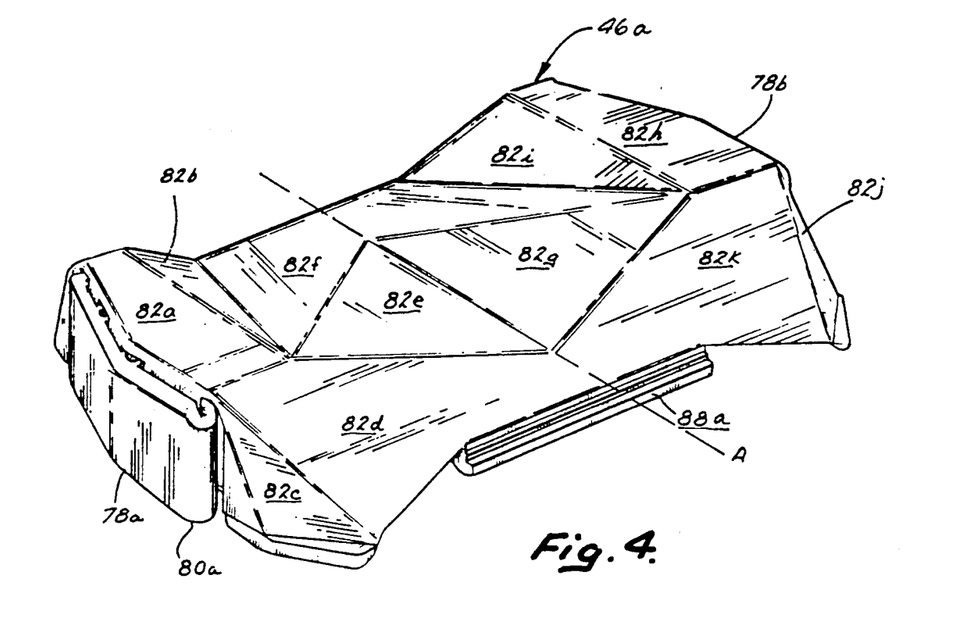
FIG. 4 is a perspective view taken from the top left front of a bi-directional diverting member.
Figure 7:
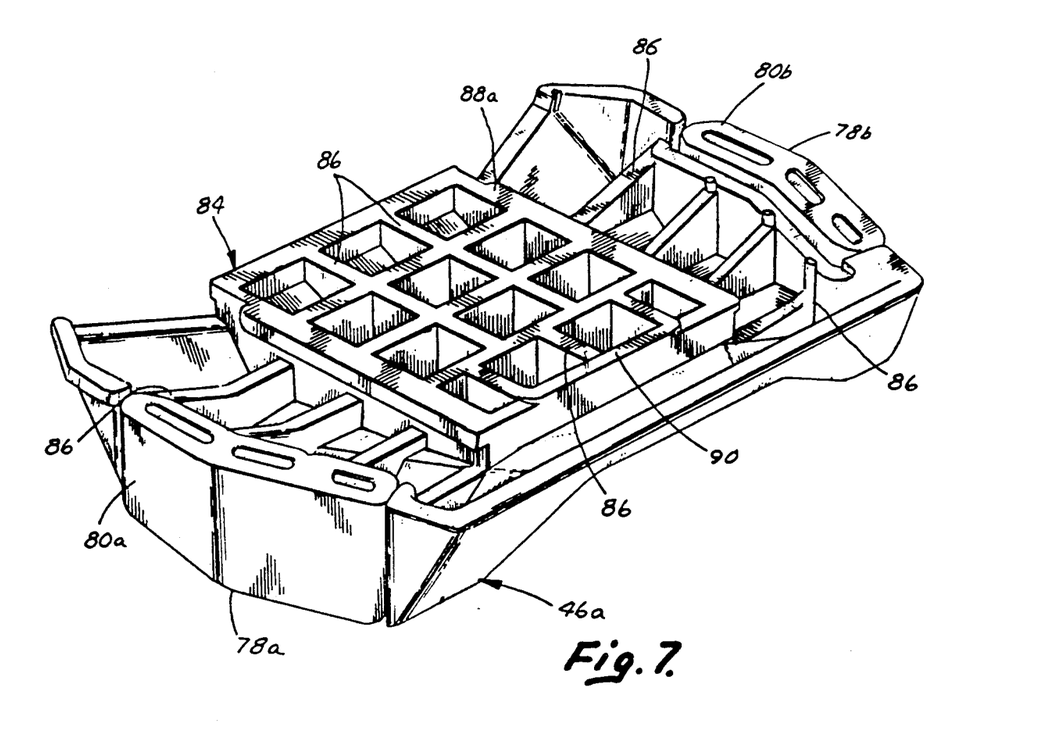
FIG. 7 is a perspective view taken from the bottom right rear of the diverting portion illustrated in FIG. 4.

A diverting member 46a is provided that is designed for use a bi-lateral diverting sortation system. Diverting member 46a includes a right vertical diverting surface 78a and a left vertical diverting surface 78b. Diverting surfaces 78a and 78b are covered with a high friction polymeric band 80a, 80b. A series of contiguous deflecting surfaces 82a, 82b, 82c, 82d, 82e, 82f, 82g, and 82h, 82i, 82j and 82k slope downwardly from diverting surfaces 78a, 78b toward the central axis A of diverting member 46a and forwardly and rearwardly with respect to the movement of the diverting member, which is in the direction of axis A. Therefore, a package striking any of the surfaces 82a-82k will be deflected progressively upwardly to a point where the upper extent of the vertical diverting surfaces 78a, 78b may pass beneath the package.

Figure 5:
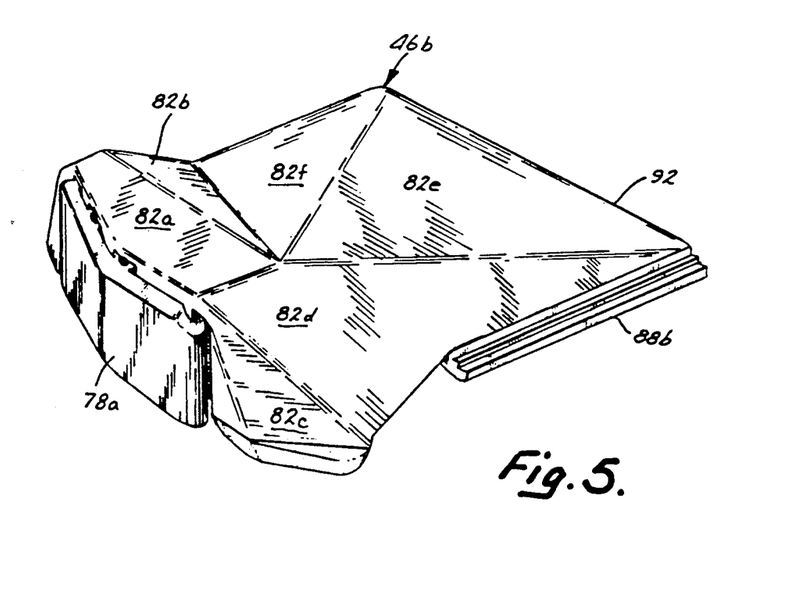
FIG. 5 is a perspective view taken from the top left front of a right-hand diverting portion.
Figure 6:
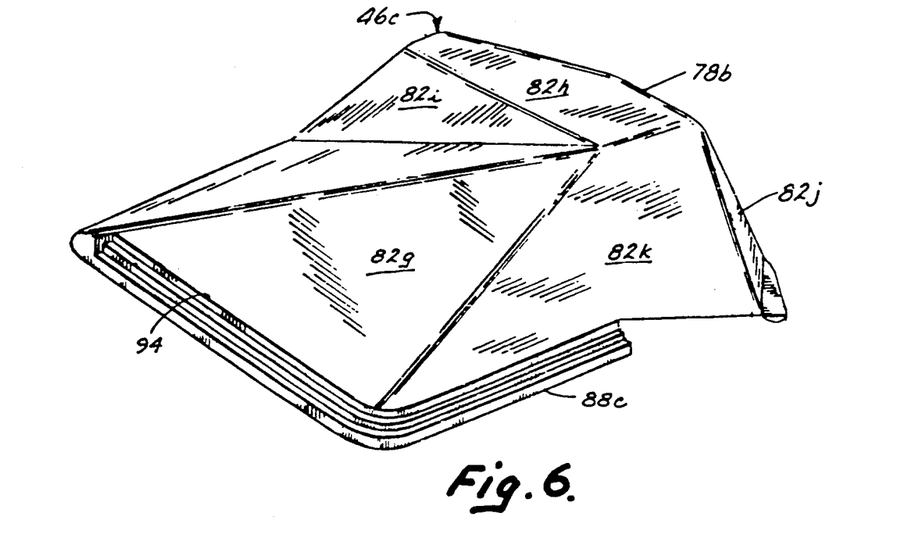
FIG. 6 is a perspective view taken from the top left front of a left-handed diverting member.

Diverting member 46a additionally includes a base 84 having a honey-comb shape defined by a multiplicity of interconnected wall segments 86. Wall segments 86 have a uniform wall thickness, which is substantially the same wall thickness as the wall defining deflection surfaces 82a-82k to ensure uniform cure of all walls. Base 84 additionally includes a projecting rib 88a, configured to engage angled undercut 72 and a locking tab 90 configured to engage locking slot 76 on the support member 44. In this manner, base 84 may be engaged with recessed portion 74 in a dovetail joint with locking members 76 and 90 securing the relationship until mechanically released Right-handed diverting member 46b (FIG. 5) includes a single vertical divert surface 78a and a series of contiguous deflecting surfaces 82a, 82b, 82c, 82d, 82e and 82f. Surfaces 82a-82f are arranged in a similar fashion in the right-handed diverting member as in the bi-directional diverting member except that the slope is from diverting surface 78a to the laterally opposite side 92 of the diverting member 46b. Right-handed diverting member 46b further includes a rib 88b which engages angled undercut 72 and a locking tab (not shown) to engage locking slot 76 of the support member to mount the right-handed diverting member interchangeably with the bi-directional diverting member 46a. Left-handed diverting member 46c (FIG. 6) only has vertical diverting surface 78b and contiguous deflecting surfaces 82g-82k which slope downwardly away from vertical surface 78b toward opposite lateral side 94. Diverting member 46c includes a rib 88c to engage angled undercut 72 of support member 44 and a locking tab (not shown) to engage locking slot 76.

Figure 10:
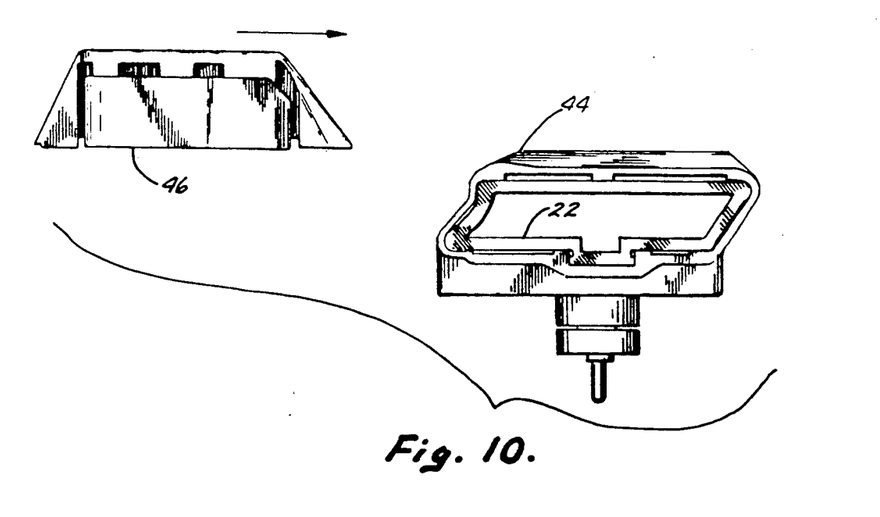
FIG. 10 is a left side elevation showing the joining of a diverting member with a support member.

Sortation system 20 is assembled by providing the appropriate diverting member 46a-46c for a bi-directional diverting system, a right-handed diverting system or a left-handed diverting system, respectively, and by sliding the diverting member onto the support member as illustrated in FIG. 10. When the diverting shoes are assembled in this manner and mounted to the slats 22, the T-shaped projections 42 on the slats engage channel 58 of the support member 44 in order to provide a lateral stabilizer to resist vertical-axis reaction forces applied about axis B to the diverting shoe 28 (see FIG. 8). The structure of the T-shaped projection 42 is to prevent wedging of the shoe by providing an approximate 5:1 length-to-width ratio for the interface with channel 58. A definite clearance is provided between the bottom of projection and the bottom of channel 58 for debris tolerance. The bearings defined between enlarged radius corners 38 and 40 of the slats and corners 64 and 66 of the support members resist reaction forces about the long axis C of the slats (see FIG. 9). However, the bearings defined between the enlarged radius corners of the slat and support member allow easy gliding of the diverting shoe along the slat. The parallelogram configuration of the slat and diverter shoe provides overlap between slats in order to reduce gaps in the conveying surface 21 of the sortation system.

In a preferred embodiment, guide portion 48 of the support member and diverting members 46 are molded from a polymeric material. This is facilitated by the substantially uniform thickness walls used throughout the members which ensure proper curing of all wall segments. In places where exceptional strength is required, such as in bases 52 and 84, wall segments are arranged in a honey-comb fashion. In a most preferred embodiment, guide portion 48 and diverting member 46 have ⅛ inch thick wall segments and are molded from acetal copolymer. Such acetal copolymer is commercially available and is marketed by Celanese Corporation under the designation Celcon Acetal Copolymer LW90, which is a bearing grade material. However, other polymeric materials could be used in the molding of the the diverting member guide portions of the support member.

Figure 12:
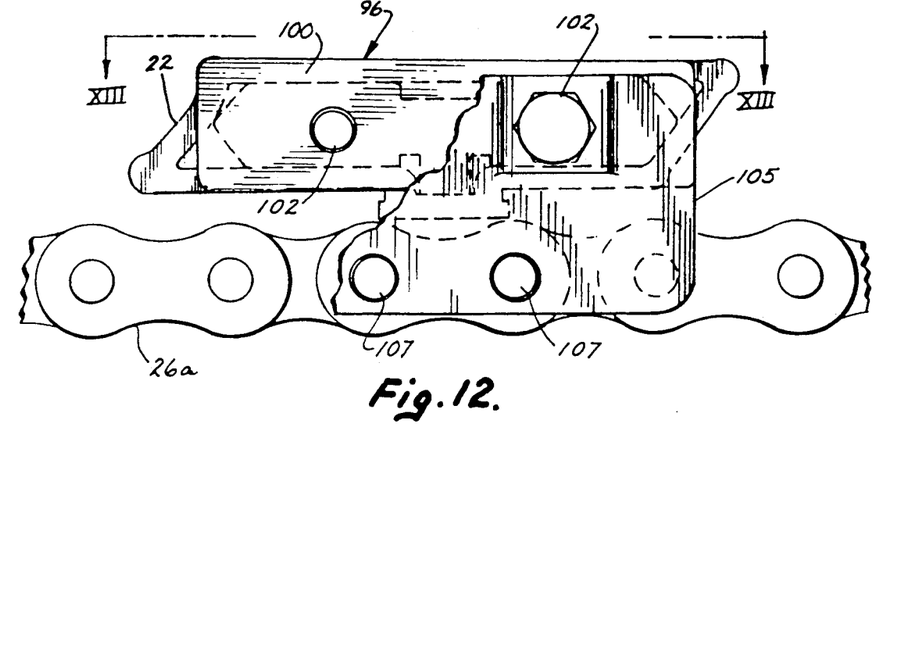
FIG. 12 is an elevation taken along the lines XII—XII in FIG. 1.
Figure 13:
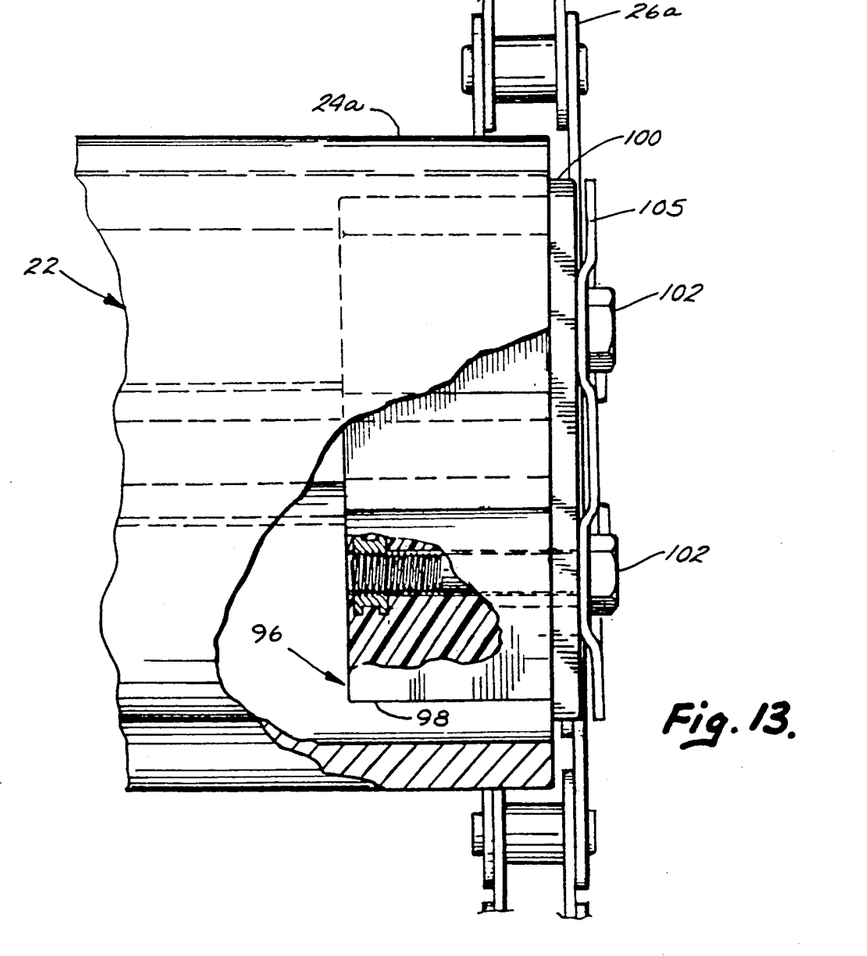
FIG. 13 is a plan view taken along the lines XIII—XIII in FIG. 12.

End portion 24a of each slat is mounted to chain 26a and the opposite end portion (not shown) is mounted to another endless chain by a mounting member 96 (FIGS. 12 and 13). Mounting member 96 includes a compression-fitting portion 98 and a spacer portion 100. Compression fitting portion 98 has a diamond-shaped profile that is substantially conforming to the internal dimensions of slat 22, but which allows use on either end of the slats. Fasteners 102 extending through openings 104 in mounting bracket 105 engage threaded inserts 106 in compression fitting portion 98. The application of torque to fasteners 102 causes compression fitting 98 to expand thus frictionally engaging the inner wall surface of the slat. Mounting bracket 105 is supported by extended pins 107 of one chain link. Spacer portion 100 is configured to be larger in profile than the compression fitting portion 98 but no larger than the outer profile of the slat such that it does not interfere with packages being diverted from the slat. The combined compression fitting and spacer provides vibration-dampening isolation between the chain and the slat which imparts significant noise-reduction, which is very important at high line speeds. In the illustrated embodiment, line speeds of 500-550 feet per minute are presently envisioned but could conceivably be greater. In the illustrated embodiment, mounting member 96 is molded of Nitrile Rubber material, having a 60 durometer grade A throughout.

The modular slats and diverter shoes provided by the present invention are intended to be used in combination with a vertically-actuated diverter switch, as disclosed in commonly-owned U.S. Pat. No. 5,038,912 for a VERTICALLY ACTUATED TRANSFER SYSTEM filed concurrently herewith, David H. Cotter inventor, the disclosure of which is hereby incorporated herein by reference. Bi-directional diverter shoes are intended to be used in a bi-directional diverting sortation system utilizing a cross-over switch of the type disclosed in commonly-owned co-pending application Ser. No. 606,504 for a TRACK INTERSECTION PIN GUIDE filed concurrently herewith, David H. Cotter, inventor, the disclosure of which is hereby incorporated herein by reference.

Changes and modifications in the specifically described embodiments can be carried out without departing from the principles of the invention, which is intended to be limited only the scope of the appended claims as interpreted by the principles of patent law including the Doctrine of Equivalents.

The embodiments of the invention in which an exclusive property or privilege is claimed are defined as follows:

1. In a conveying system having a longitudinally moving conveying surface defined by the uppermost ones of a plurality of slats connected at opposite ends in spaced relation with each other to a pair of endless chains; a plurality of diverter shoes each moveably mounted on one of said slats for lateral movement with respect to said conveying surface; and track means engaging said diverter shoes for imparting a lateral force to move said diverter shoes laterally to displace product positioned on said conveying surface, wherein the improvement comprises:

each of said slats being defined by a wall formed as a right cylinder including an outer surface having a planar upper portion defining said conveying surface; and each of said diverter shoes having a support portion including a substantially continuous glide surface surrounding said wall, said glide surface having substantially the same configuration as said outer surface of said slat.

2. The conveying system in claim 1 wherein said right cylinder has a quadrilateral-shaped cross-section including one side defining said planar upper portion.

3. The sortation system in claim 2 wherein said right cylinder has a parallelogram-shaped cross-section.

4. The conveying system in claim 1 wherein each of said slats is formed by extrusion.

5. The conveying system in claim 1 wherein each of said slats further includes mounting means for mounting said opposite ends of said wall to said chains.

6. The conveying system in claim 5 wherein said mounting means includes vibration dampening material between said wall and said chains.

7. The conveying system in claim 5 wherein said mounting means includes a compression fitting for engaging an inner surface of said wall.

8. The conveying system in claim 1 wherein said glide surface is defined by an anti-friction material.

9. The conveying system in claim 1 wherein each of said diverter shoes further includes a diverting portion joined to said support portion.

10. The conveying system in claim 9 wherein said support and diverting portions of said diverter shoes are molded acetal copolymer.

11. The conveying system in claim 10 wherein said support and diverting portions of said diverter shoes are defined by a multiplicity of joined wall segments having substantially the same thickness.

12. The conveying system in claim 9 wherein said diverting portion is joined to said support portion by a dovetail groove.

13. In a conveying system having a longitudinally moving conveying surface defined by the uppermost ones of a plurality of slats connected in spaced relation with each other in an endless web; a plurality of diverter shoes each movably mounted on one of said slats for lateral movement with respect to said conveying surface; and track means engaging said diverter shoes for imparting a lateral force to move said diverter shoes laterally to displace product positioned on said conveying surface, wherein the improvement comprises:

each of said slats defined by a wall having generally planar upper and lower wall portions joined by side wall portions defining joining edges between each of said wall portions;

each of said diverter shoes having a support portion including a glide surface surrounding said wall; and bearing means defining a bearing between at least one of said joining edges of each of said slats and an engaging portion of said glide surface of the corresponding one of said diverter shoes.

14. The conveying system in claim 13 wherein said bearing means includes means defining an enlarged radius surface at said one of said joining edges.

15. The conveying system in claim 13 wherein said bearing means defines bearings between two opposite said joining edges and engaging portions of said glide surface.

16. The conveying system in claim 15 wherein each of said bearings includes means defining an enlarged radius surface at each of said two opposite joining edges.

17. The conveying system in claim 13 further including means defining lateral stabilizing means between one of said wall portions of each of said slats and an engaging portion of said glide surface of the corresponding one of said diverter shoes, said lateral stabilizing means resisting vertical-axis reaction-force-couples.

18. The conveying system in claim 17 wherein said one of said wall portions is said lower wall portion.

19. The conveying system in claim 17 wherein said lateral stabilizing means includes a T-shaped portion extending from said one of said wall portions being slidably positioned in a slot defined in said engaging portion of said glide surface.

20. The conveying system in claim 13 wherein said support portion is molded of a polymeric material.

21. The conveying system in claim 20 wherein said polymeric material is acetal copolymer.

22. The sortation system in claim 20 wherein said support portion is defined by a multiplicity of joined wall segments having substantially the same thickness.

23. In a conveying system having a longitudinally moving conveying surface defined by the uppermost ones of a plurality of slats connected in spaced relation with each other in an endless web; a plurality of diverter shoes each movably mounted on one of said slats for lateral movement with respect to said conveying surface; and track means engaging said diverter shoes for imparting a lateral force to move said diverter shoes laterally to displace product positioned on said conveying surface, wherein the improvement comprises:

each of said slats defined by a wall having generally planar upper and lower wall portions joined by side wall portions defining joining edges between each of said wall portions;

each of said diverter shoes having a support portion includes a glide surface surrounding said wall; and means defining lateral stabilizing means between one of said wall portions of each of said slats and an engaging portion of said glide surface of the corresponding one of said diverter shoes, said lateral stabilizing means resisting vertical-axis reaction-force-couples.

24. The conveying system in claim 23 wherein said one of said wall portions is said lower wall portion.

25. The conveying system in claim 23 wherein said lateral stabilizing means includes an outward extension of said one of said wall portions being slidably positioned in a slot defined in said engaging portion of said glide surface.

26. The conveying system in claim 25 wherein said outward extension is T-shaped.

27. The conveying system in claim 23 wherein said support portion is molded of a polymeric material.

28. The conveying system in claim 27 wherein said polymeric material is acetal copolymer.

29. The conveying system in claim 27 wherein said support portion is defined by a plurality of joined wall segments having substantially the same thickness.

30. A diverter shoe for use in a conveyor system having a longitudinally moving conveying surface defined by the uppermost ones of a plurality of slats connected in spaced relation with each other in an endless web; and track means extending below said uppermost ones of said slats for engaging and imparting a lateral force to displace selected ones of said diverter shoes laterally with respect to said conveying surface; said diverter shoe comprising:

a support member having a glide portion including means defining a glide surface adapted to glide along one of said slats; and a diverting member joined to said support member and having at least one substantially vertical diverting surface on a lateral end thereof and a plurality of contiguous, generally planar surfaces sloping downward from an upper extent of said diverting surface laterally inward and longitudinally forward or rearward.

31. The diverter shoe in claim 30 having one said diverting surface and wherein said planar surfaces slope laterally inward to another lateral end of said diverting member opposite said diverting surface.

32. The diverter shoe in claim 30 having a pair of diverting surfaces, each on opposite lateral ends of said diverting member and wherein said planar surfaces slope laterally inward to a central portion of said diverting surface.

33. The diverter shoe in claim 30 wherein said support member guide portion is molded of a polymeric material.

34. The diverter shoe in claim 33 wherein said polymeric material is acetal copolymer.

35. The diverter shoe in claim 33 wherein said glide portion is defined by a multiplicity of interconnected wall segments having substantially the same thickness.

36. The diverter shoe in claim 30 wherein said support member includes a follower portion adapted to be engaged by said track means and a base portion defined by said glide portion for mounting said follower portion, said base portion defined by a plurality of said wall segments arranged in a honey-comb manner.

37. The diverter shoe in claim 30 wherein said diverting member is molded of a polymeric material.

38. The diverter shoe in claim 37 wherein said polymeric material is acetal copolymer.

39. The diverter shoe in claim 37 wherein said diverting member is defined by a multiplicity of interconnected surface segments having substantially the same thickness.

40. The diverter shoe in claim 30 wherein said diverting member is joined to said support member by a dovetail joint.

41. The diverter shoe in claim 40 wherein said dovetail joint includes a locking detent.

42. A diverter shoe for use in a conveyor system having a longitudinally moving conveying surface defined by the uppermost ones of a plurality of slats connected in spaced relation with each other in an endless web; and track means extending below said uppermost ones of said slats for engaging and imparting a lateral force to displace selected ones of said diverter shoes laterally with respect to said conveying surface; said diverter shoe comprising:
- a support member having a glide portion including means defining a glide surface adapted to glide along one of said slats;
- a diverting portion joined to said support portion and having at least one substantially vertical diverting surface on a lateral end thereof; and
- wherein said support member glide portion is defined by a multiplicity of interconnected wall segments having substantially the same thickness.

43. The diverter shoe in claim 42 wherein said glide portion is molded of a polymeric material.

44. The diverter shoe in claim 43 wherein said polymeric material is acetal copolymer.

45. The diverter shoe in claim 42 wherein said support member includes a follower portion adapted to be engaged by said track means and a base portion defined by said glide portion for mounting of said follower portion, said base portion defined by a plurality of said wall segments arranged in a honey-comb manner.

46. The diverter shoe in claim 42 wherein said diverting member is defined by a multiplicity of interconnected wall segments having substantially the same thickness.

47. The diverter shoe in claim 46 wherein said diverting member is molded of a polymeric material.

48. The diverter shoe in claim 47 wherein said polymeric material is acetal copolymer.

49. The diverter shoe in claim 46 wherein said diverting member includes a base portion for attachment to said support member, said base portion defined by a plurality of said wall segments arranged in a honey-comb manner.

50. The diverter shoe in claim 42 wherein said diverting member is joined to said support member by a dovetail joint.

51. The diverter shoe in claim 50 wherein said dovetail joint includes a locking member.

* * * * *

UNITED STATES PATENT AND TRADEMARK OFFICE
CERTIFICATE OF CORRECTION

PATENT NO. : 5,127,510

DATED : July 7, 1992

INVENTOR(S) : David H. Cotter et al.

It is certified that error appears in the above-identified patent and that said Letters Patent is hereby corrected as shown below:

Column 8, claim 33, line 39,
      "guide" should be --glide--.

Signed and Sealed this

Twenty-sixth Day of October, 1993

Attest:

BRUCE LEHMAN

*Attesting Officer*    *Commissioner of Patents and Trademarks*